Sept. 15, 1936.   A. ABRAMS ET AL   2,054,113
COATED SHEET MATERIAL
Filed Oct. 16, 1933
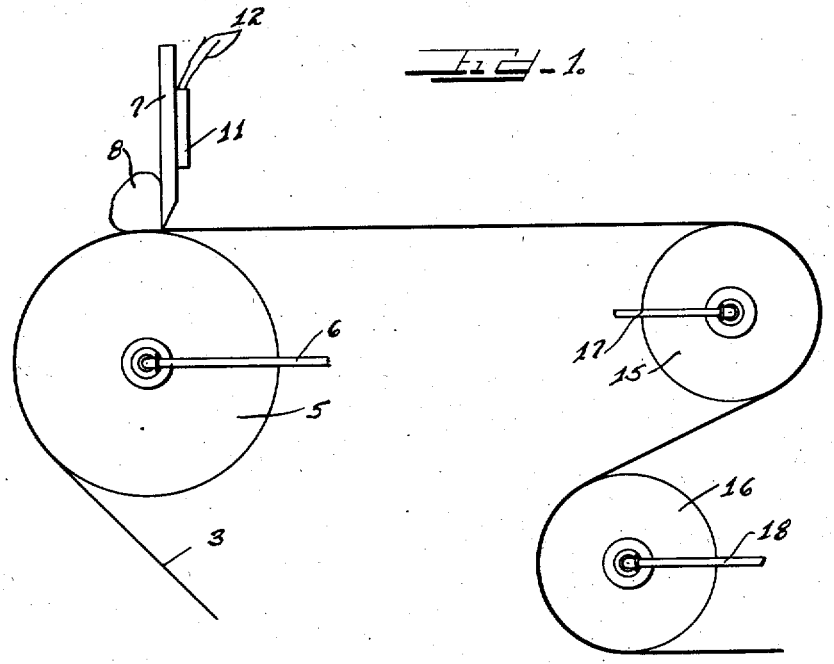
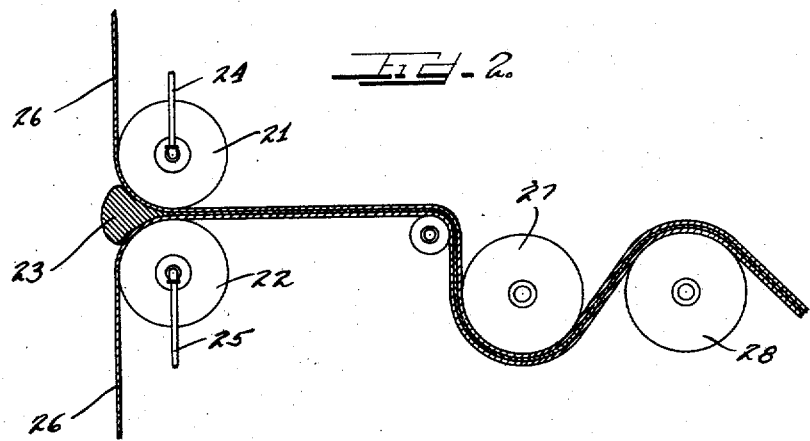
Inventors
Allen Abrams.
Charley L. Wagner.
by Charles W. Mills Attys.

Patented Sept. 15, 1936

2,054,113

UNITED STATES PATENT OFFICE 2,054,113

COATED SHEET MATERIAL

Allen Abrams and Charley L. Wagner, Wausau, Wis., assignors to Marathon Paper Mills Company, Rothschild, Wis., a corporation of Wisconsin Application October 16, 1933, Serial No. 693,741

10 Claims. (Cl. 91—68)

This invention relates to a coated sheet material or to laminated material and to a method of producing the same.

It has heretofore been suggested, in connection with the impregnation of fabric and leather materials, to use mixtures of various substances, including rubber, with paraffin or other waxy materials. In general, the objective has been to secure a solution of rubber or related materials in a wax that will have a relatively low viscosity and therefore good penetrating properties. For this purpose, it has been suggested to use volatile solvents or thinners, and also, where volatile solvents are omitted, to heat the solution to a sufficiently high temperature or otherwise treat the solution so as to greatly lower its viscosity.

For our purposes, however, we have found it necessary to employ a solution of rubber or rubber-like substance in wax in such proportions as to have a relatively high viscosity. The solution for coating or adhesive purposes should be one that does not "strike through" the paper or other web or sheet material to which it is applied, but should remain primarily as a surface coating. Such coating should be tough, flexible and thermoplastic and/or adhesive, and should impart moistureproofness, waterproofness and gasproofness to the paper or other base.

It is therefore an object of the present invention to provide a sheet coated with a film material that is tough, flexible and thermoplastic and/or adhesive, and that possesses a relatively high degree of moistureproofness, waterproofness and gasproofness.

It is a further important object of this invention to provide a laminated sheet or web material having an adhesive layer joining the superimposed laminations that imparts moistureproofness, waterproofness and gasproofness to the laminated article and that is substantially colorless and odorless.

It is a further object of the present invention to provide a flexible, heat-sealing sheet material having a waterproof, non-tacky surface coating comprising rubber and paraffin wax.

It is a further object of this invention to provide a coated sheet material having heat-sealing qualities capable of effecting a strong bond between board, paper, metal foil and the like, without striking through or impregnating the component laminations.

It is an additional object of this invention to provide a process for producing flexible, moistureproof, waterproof and gasproof sheet material having heat-sealing properties.

Other and further objects of this invention will be evident from the following specification and the accompanying drawing.

On the drawing:

Figure 1 represents a diagrammatic side elevation of a coating machine for producing our coated sheet material.

Figure 2 represents a diagrammatic side elevational view of a machine for producing our laminated sheet material, with the paper webs in section and exaggerated in thickness for clarity.

The composition which we use for coating and laminating purposes comprises a solution of rubber or a rubber-like substance in a wax or wax-like substance. Among the suitable rubber and rubber-like substances may be mentioned—pale crepe rubber, smoked sheet rubber, gutta percha.

Among the suitable waxes and wax-like substances are—paraffin wax, bleached beeswax, spermaceti.

Since solutions of rubber in wax have widely varying viscosities, depending upon the proportions and particular ingredients used and upon the conditions of preparation, we have found it is of assistance first to determine the limits of viscosity within which the solutions show satisfactory results. In general, a solution to be suitable for coating and laminating purposes should have a viscosity of not less than about 8000 secs. (measured on a Scott viscosimeter at 90° C.). Below this viscosity, there is a tendency of the solution to "strike through" or penetrate the sheet coated therewith.

The ability of a solution to strike through, however, is naturally different with different weights and kinds of paper. The less hydrated and thinner papers require a solution of greater viscosity to prevent penetration, whereas solutions of lower viscosities can be employed with heavier and more highly hydrated papers. Consequently, the viscosity of the rubber-wax solution may be as low as 1000 to 2000 secs. when the solution is to be used with heavier and/or more highly hydrated paper or with other sheet material having greater impenetrability toward the coating solution. It is, of course, possible to "wax" a paper on one side only with straight paraffin wax without having the wax strike into the sheet, but this must be done by maintaining a very low temperature and furthermore the resultant coated sheet is far from being moistureproof.

From a standpoint of good adhesiveness, the viscosity of the rubber-wax solution may be varied through even wider ranges than above indicated, although viscosities above 8000 secs. appear to be preferable. In fact, solutions having viscosities that are too high to be conveniently run on a Scott viscosimeter, exhibit excellent adhesiveness.

The preferred composition of our invention is produced by dissolving from 6 to 30% of unvulcanized rubber in melted paraffin wax. The paraffin wax is heated to a temperature of 180 to 220° F. and the rubber is added in a shredded, or other subdivided condition. The temperature drops upon the addition of the rubber and should preferbaly be maintained at between 160 and 180° F. and the mixture stirred until the rubber is completely dissolved. It is necessary to keep the temperature of the rubber-paraffin mix at about the temperatures indicated in order to avoid overheating, which results in an undesirable darkening of the mass and imparts considerable odor to it. In addition, overheating reduces the viscosity of the solution considerably.

After the rubber has been in the paraffin for about an hour, the pieces of rubber are sufficiently softened and swollen to permit complete disintegration by agitation. With an ordinary revolving blade stirrer, it requires 5 to 6 hours to produce a smooth solution of the rubber and paraffin, but with equipment specially designed for this work, the time can be materially reduced.

In compositions of our invention up to about 30% by weight of the mixture of pale crepe rubber, at which point the viscosity becomes too great for ready application, the cohesiveness of the mixture and its adhesiveness, as a coating, increase with the viscosity of the mixture. It is therefore important not to lower the viscosity of any given mixture unnecessarily, as by increasing the temperature or time of heating of the ingredients when dissolving the rubber in the wax. The viscosity, for a given concentration of rubber in wax, decreases with the time of heating.

As to the effect of temperature on viscosity, we have found that with a given concentration of pale crepe rubber in wax, the viscosity at a given temperature is inversely proportional to the temperature to which the mixture has been heated during or after the solution period. For instance, the effect of temperature on the viscosity of a solution of 6% pale crepe rubber in paraffin wax was determined by quickly heating the mixture to a given temperature and holding at that temperature for one hour, with the following results:

| Temperature (1 hour) | Viscosity (Scott at 90° C., 50 cc.) |
|---|---|
| 150° F. | 12000 |
| 250 | 6500 |
| 300 | 1000 |

With a given concentration of rubber in wax, the viscosity decreases with the time of milling the rubber used in the mixture.

With a given concentration of rubber in wax, very small percentages of a rubber accelerator, such as mercaptobenzothiazol, will markedly reduce the viscosity. This effect is dependent on the particular accelerator used and also upon the percentage added.

With a given concentration of rubber in wax, vulcanizing agents (such as sulphur chloride) reduce the viscosity.

With a given concentration of rubber in wax, the addition of anti-oxidants, such as symmetrical dibeta-naphthyl-p-phenylene diamine, have little or no effect on the viscosity.

Additional viscosity may be obtained over that of pure paraffin by the addition to paraffin of other materials such as aluminum stearate, but the resultant mixture does not have as good adhesiveness nor moistureproofness as a rubber-paraffin mixture of equal viscosity.

When the percentage of rubber is too low, the composition is not sufficiently flexible at low temperatures for use as a coating and does not have satisfactory adhesive properties. Also, the viscosity is so low that the composition strikes through the sheet material. When too much rubber is used, the composition is too viscous and is too tough to be a satisfactory adhesive.

For this reason we prefer, when using unvulcanized rubber, to keep the percentage of rubber in our composition between 10 and 20%, although some of the advantages of our invention can be obtained with the rubber as low as 6% or as high as 30%, by weight, of the mixture. In the case of gutta percha, the percentage of gutta percha may be increased above 30% without causing too high a viscosity. In general, higher percentages of milled rubber and gutta percha are required to give viscosities corresponding with those obtained by the use of unvulcanized, unmilled rubber.

Pale crepe rubber or smoked sheets, may be used most satisfactorily, but pale crepe rubber is preferable because of the odor and color of the smoked sheet. A preferred formula for our composition is as follows:

Percent by weight
Paraffin wax
  (M. P. 120-140° F.) _____ 88
Rubber
  (Pale crepe) _____ 12

Resinous materials may be added to our composition, with a slight advantage in sealing properties but with a greater tendency to "block". By the term "block" is meant the property possessed by sheet material when stacked to adhere together, as for instance under unusually high climatic temperature. The use of gum rosin, for example, to replace an equal weight, up to about 15% of the paraffin can be effected without seriously increasing the blocking tendency of our composition. When the sheets are piled together they do not under ordinary conditions stick to each other or "block", but to further prevent blocking, the surfaces may be dusted with substances, such as mica.

Referring to the drawing, in Fig. 1 the reference numeral 3 designates a web of fibrous material which is to be coated by our process. The sheet 3 passes over a roller 5 which is heated by steam entering through the pipe 6, or by other suitable means. While this roll may be rotatably mounted, if desired, we prefer to provide a stationary mounting and permit the sheet material to slide around the roll, since this procedure makes possible a greater uniformity in the coating of the sheet because the effect of irregularities in the surface of the roll is eliminated.

A doctor bar 7 is placed directly above and adjustably spaced from the roll 5, the spacing determining the thickness of the coating on the finished sheet material. Coating material 8 such as previously described is supplied to the web ahead of the doctor bar. As the web passes underneath the coating material, it acquires a thin film of said material, the thickness of which is made uniform by the doctor bar 7. No container for the coating material is ordinarily required, since it is sufficiently viscous to remain in the position shown.

The doctor bar 7 may be maintained at a constant temperature by a heating element 11 which is supplied with electric current by the conductors 12. Other suitable heating means may also be employed.

After passing under the doctor bar 7, the web material passes over rolls 15 and 16 which are cooled by water entering through pipes 17 or 18 or by other suitable means.

Our invention also contemplates other methods of coating wherein either one or both sides of a web of material, such as fiber or paper board may be coated.

The temperature to which the roll 5 and the doctor 7 are heated may vary between 180 and 230° F. In any case, the temperature must be sufficient to soften the composition used and cause it to adhere to the paper during the coating process.

The thickness of the layer of composition on our paper may be varied by adjusting the distance between the roll 5 and the doctor 7. We prefer to adjust our device so that between 10 and 20 pounds of our composition will be coated onto each ream of paper (3,000 square feet) but any amount between 4 and 50 pounds per ream will produce coatings that are satisfactory for certain purposes.

Our new paper product is not only water- and moistureproof but it has the important advantage of being heat-sealing. If a piece of paper coated on one side in accord with our process is placed upon another untreated paper and the two sheets are simultaneously heated and pressed together, they will adhere firmly over their entire contacting surfaces. We find that the minimum temperature and time required to make a suitable heat seal will vary slightly with the composition of the mixture of rubber and paraffin. If it contains, for example 12% of pale crepe rubber, it will seal in not over 3 seconds at a temperature of 300 to 500° F., dependent upon the thickness of the paper to which the seal is being made. We have found that satisfactory seals may be made at temperatures ranging from 200 to 500° F.

An important difference between this and prior coatings of this type is that the coating material of our preferred composition does not soak into the paper but remains as a surface layer. There is no objectionable "striking through" of the coating to give a discoloration on the exposed or opposite surfaces of a coated or laminated sheet.

Our new coating composition has other important advantages over previously known materials of this type. The composition coating is non-tacky and much more elastic and flexible than pure paraffin wax coatings, especially at low temperatures. In fact, its elasticity and flexibility are much less affected by cold than is paraffin wax itself. Consequently, the coated paper of our invention is much less liable to lose moistureproofness on wrinkling than is a corresponding paper treated with paraffin wax alone. The coating composition itself is substantially colorless, tasteless and odorless and moisture-, water- and gasproof. Since it is not attached by molds and other fungus growths, it can be suitably used in the manufacture of waterproof, moistureproof and mold proof tape.

Boxes or containers for merchandise, if made from fiber- or paper board coated with our material, may be sealed by heat and pressure alone. This means that in one operation it is possible to provide a smooth, waterproof, moistureproof and gasproof surface coating which will permit the container to be heat-sealed. Since the combination of these qualities is desirable in containers for many food products, it is evident that our product may be suitably used in the manufacture of an improved container.

In Fig. 2 there is illustrated diagrammatically a method of forming laminated sheet or web material. The apparatus for carrying out this method includes a pair of heated squeeze rolls 21 and 22, arranged in either vertical or horizontal alignment, which may be suitably heated by steam introduced through pipes 24 and 25. The rolls 21 and 22 are provided with means (not shown) for adjusting the pressure exerted by one roll against the other. Other rolls, 27 and 28 may be suitably used as chill rolls, although these may be dispensed with entirely or the number varied.

Webs 26, 26 of the material to be laminated are led over the respective rolls 21 and 22 to pass between the nip of these rolls and thence between rolls 27 and 28. A mass of coating material 23 is positioned in advance of the nip between the rolls 21 and 22 and is picked up by the surfaces of the web material 26 as the webs pass into the nip of the rolls. The rolls 21 and 22 are carried at a sufficiently high temperature to soften the viscous mass of coating material and to permit it to be spread out uniformly over the surfaces of the webs 26. The temperature of the viscous mass may satisfactorily be about 220° F. The thickness of the sealing layer is governed by the pressure exerted against the composite web by the rolls 21 and 22.

Laminated sheet material made with the adhesive composition above described has the advantage of being moistureproof, waterproof and gasproof to a high degree. At the same time, white laminations may be produced. This is a distinct advantage, since the present asphalt laminated sheets are dark colored and have an odor. The strength of the adhesive seal uniting the laminations is such that the component laminations can rarely be separated, when the preferred adhesive composition is used, without rupturing the material of the laminations themselves. We also secure a printable and gluable product. Where lightweight translucent papers are used, such as bleached sulphite, greaseproof, glassine and parchment papers and the like, very satisfactory wrapping paper can be produced having the property of translucency in addition to the other properties aforementioned.

While we have described our invention as relating to coated or laminated paper, it will be understood that it may be practiced with fiberboard, metal foil, fabric materials, wood veneer and the like, and we contemplate its use in connection with each of these substances.

Further, where it is desired to provide a white or colored coated sheet, we have found that suitable white or colored pigments may be incorporated into the coating composition. This is best accomplished by incorporating the pigments into the rubber in the first instance and then dissolving the pigmented rubber in the paraffin wax in the manner already described. By our method, a permanent suspension of the pigments in the paraffin wax-rubber solution is obtained.

The term "rubber" as used in the appended claims is intended to include the use of india rubber or Hevea rubber, gutta rubber, and their natural or synthetic equivalents for the purpose of this invention, singly or mixtures thereof. It is understood of course that in the coated product the rubber content may be vulcanized or unvulcanized as desired.

The term "wax" as used in the appended claims is intended to include the use of paraffin wax, beeswax, spermaceti, candelilla, carnauba and their natural or synthetic equivalents, singly or mixtures thereof, suitable for the purpose of this invention.

We are aware that numerous details of our invention may be varied through a wide range without departing from the principles thereof, and we, therefore, do not purpose limiting the patent granted hereon otherwise than necessitated by the prior art.

We claim as our invention:

1. The method of coating paper and the like, which comprises passing a web of paper over a heated surface into contact with a mass resting on said web of a heated plastic composition of rubber and paraffin wax having a viscosity of at least 8000 secs. (Scott viscosimeter at 90° C.) and controlling the thickness of the coating of said composition that adheres to said web by means of a rigid heated edge closely spaced from said first heated surface.

2. The method of coating web material, which comprises drawing said web material between an arcuate heated surface and a heated rigid straight edge closely spaced from said surface, supplying a coating composition to said web from a heated, plastic mass of the composition resting on said web ahead of said straight edge, said composition comprising a mixture of from 6 to 30% rubber and from 94 to 70% paraffin wax, and adjusting said straight edge to control the thickness of said coating.

3. The method of coating web material, which comprises drawing said web material over a heated curved supporting surface, applying directly to said web while so supported a heated plastic mass of a rubber-wax composition of such high viscosity as to be self-retaining of its unitary mass without confining walls and smoothing off the plastic composition adhering to said web to obtain a uniform smooth coating on said web.

4. The method of preparing heat-sealing sheet material having a flexible, moistureproof, waterproof and gasproof surface coating, which comprises forming a composition of paraffin wax and unvulcanized rubber containing from 6 to 30% of rubber and from 94 to 70% of wax, depositing a heated mass of said composition having a viscosity of at least 8000 secs. (Scott viscosimeter at 90° C.) upon a supported traveling web, heating said web while in direct contact with said mass to cause said composition to adhere to said web, applying heat directly to the upper surface of the composition adhering to said web and leveling off said adhering composition to obtain a uniform smooth coating on said web.

5. Paper and the like having a superficially adherent thin flexible non-tacky moisture-water- and gas-proof rubber-wax composition, said layer being formed from a composition comprising from 94 to 70% paraffin wax and from 6 to 30% pale crepe rubber and having a viscosity of at least 8,000 secs. (Scott viscosimeter at 90° C.).

6. A fibrous sheet material having a superficially adherent thin flexible non-tacky moisture-water-and gas-proof layer of rubber-wax composition formed from a composition comprising wax and a sufficient quantity of rubber so compounded as to have a viscosity above 8,000 secs. (Scott viscosimeter at 90° C.).

7. The method of coating paper and the like, which comprises passing a web of paper over a heated surface into contact with a mass resting on said web of a heated plastic composition comprising rubber and paraffin wax having a viscosity of at least 8,000 secs. (Scott viscosimeter at 90° C.) and controlling the thickness of the coating of said composition that adheres to said web by adjustable heated means closely spaced from said first heated surface.

8. The method of coating web material, which comprises drawing said web material over a heated supporting surface, applying directly to said web while so supported a heated plastic mass of a rubber-wax composition of such high viscosity as to be self-retaining of its unitary mass without confining walls and smoothing off the plastic composition adhering to said web to obtain a uniform smooth coating on said web.

9. The method of superficially coating sheeting material with an elastic flexible non-tacky moisture-water- and gas-proof layer which comprises applying thereto a plastic rubber-wax composition having a viscosity of at least 8000 secs. (Scott viscosimeter at 90° C.), levelling said composition to form a coating of suitable thickness, and cooling the coated sheet to solidify said coating composition.

10. A sheet material having a superficially adherent thin flexible non-tacky moisture-water- and gasproof layer of rubber-wax composition formed from a composition comprising wax and a sufficient quantity of rubber so compounded as to have a viscosity above 8,000 secs. (Scott viscosimeter at 90° C.).

ALLEN ABRAMS.
CHARLEY L. WAGNER.

DISCLAIMER 2,054,113.—*Allen Abrams* and *Charley L. Wagner*, Wausau, Wis. COATED SHEET MATERIAL. Patent dated September 15, 1936. Disclaimer filed February 7, 1938, by the assignee, *Marathon Paper Mills Company*.

Hereby disclaims from the scope of claim 5 of said patent any product except wherein the superficially adherent layer of rubber-wax composition is formed from the composition comprising wax and rubber while hot and wherein the viscosity as set forth in said claim is a property of said composition of wax and rubber as initially compounded and as used in such forming process;

And hereby disclaims from the scope of claims 6 and 10 of said patent any product except wherein the superficially adherent layer of rubber-wax composition is formed from the composition comprising wax and rubber while hot and wherein the viscosity as set forth in said claims is a property of said composition comprising wax and rubber as initially compounded and as used in such forming process.

[*Official Gazette March 1, 1938.*]

natural or synthetic equivalents for the purpose of this invention, singly or mixtures thereof. It is understood of course that in the coated product the rubber content may be vulcanized or unvulcanized as desired.

The term "wax" as used in the appended claims is intended to include the use of paraffin wax, beeswax, spermaceti, candelilla, carnauba and their natural or synthetic equivalents, singly or mixtures thereof, suitable for the purpose of this invention.

We are aware that numerous details of our invention may be varied through a wide range without departing from the principles thereof, and we, therefore, do not purpose limiting the patent granted hereon otherwise than necessitated by the prior art.

We claim as our invention:

1. The method of coating paper and the like, which comprises passing a web of paper over a heated surface into contact with a mass resting on said web of a heated plastic composition of rubber and paraffin wax having a viscosity of at least 8000 secs. (Scott viscosimeter at 90° C.) and controlling the thickness of the coating of said composition that adheres to said web by means of a rigid heated edge closely spaced from said first heated surface.

2. The method of coating web material, which comprises drawing said web material between an arcuate heated surface and a heated rigid straight edge closely spaced from said surface, supplying a coating composition to said web from a heated, plastic mass of the composition resting on said web ahead of said straight edge, said composition comprising a mixture of from 6 to 30% rubber and from 94 to 70% paraffin wax, and adjusting said straight edge to control the thickness of said coating.

3. The method of coating web material, which comprises drawing said web material over a heated curved supporting surface, applying directly to said web while so supported a heated plastic mass of a rubber-wax composition of such high viscosity as to be self-retaining of its unitary mass without confining walls and smoothing off the plastic composition adhering to said web to obtain a uniform smooth coating on said web.

4. The method of preparing heat-sealing sheet material having a flexible, moistureproof, waterproof and gasproof surface coating, which comprises forming a composition of paraffin wax and unvulcanized rubber containing from 6 to 30% of rubber and from 94 to 70% of wax, depositing a heated mass of said composition having a viscosity of at least 8000 secs. (Scott viscosimeter at 90° C.) upon a supported traveling web, heating said web while in direct contact with said mass to cause said composition to adhere to said web, applying heat directly to the upper surface of the composition adhering to said web and leveling off said adhering composition to obtain a uniform smooth coating on said web.

5. Paper and the like having a superficially adherent thin flexible non-tacky moisture-water- and gas-proof rubber-wax composition, said layer being formed from a composition comprising from 94 to 70% paraffin wax and from 6 to 30% pale crepe rubber and having a viscosity of at least 8,000 secs. (Scott viscosimeter at 90° C.).

6. A fibrous sheet material having a superficially adherent thin flexible non-tacky moisture-water-and gas-proof layer of rubber-wax composition formed from a composition comprising wax and a sufficient quantity of rubber so compounded as to have a viscosity above 8,000 secs. (Scott viscosimeter at 90° C.).

7. The method of coating paper and the like, which comprises passing a web of paper over a heated surface into contact with a mass resting on said web of a heated plastic composition comprising rubber and paraffin wax having a viscosity of at least 8,000 secs. (Scott viscosimeter at 90° C.) and controlling the thickness of the coating of said composition that adheres to said web by adjustable heated means closely spaced from said first heated surface.

8. The method of coating web material, which comprises drawing said web material over a heated supporting surface, applying directly to said web while so supported a heated plastic mass of a rubber-wax composition of such high viscosity as to be self-retaining of its unitary mass without confining walls and smoothing off the plastic composition adhering to said web to obtain a uniform smooth coating on said web.

9. The method of superficially coating sheeting material with an elastic flexible non-tacky moisture-water- and gas-proof layer which comprises applying thereto a plastic rubber-wax composition having a viscosity of at least 8000 secs. (Scott viscosimeter at 90° C.), levelling said composition to form a coating of suitable thickness, and cooling the coated sheet to solidify said coating composition.

10. A sheet material having a superficially adherent thin flexible non-tacky moisture-water- and gasproof layer of rubber-wax composition formed from a composition comprising wax and a sufficient quantity of rubber so compounded as to have a viscosity above 8,000 secs. (Scott viscosimeter at 90° C.).

ALLEN ABRAMS.
CHARLEY L. WAGNER.

DISCLAIMER 2,054,113.—*Allen Abrams* and *Charley L. Wagner*, Wausau, Wis. COATED SHEET MATERIAL. Patent dated September 15, 1936. Disclaimer filed February 7, 1938, by the assignee, *Marathon Paper Mills Company*.

Hereby disclaims from the scope of claim 5 of said patent any product except wherein the superficially adherent layer of rubber-wax composition is formed from the composition comprising wax and rubber while hot and wherein the viscosity as set forth in said claim is a property of said composition of wax and rubber as initially compounded and as used in such forming process;

And hereby disclaims from the scope of claims 6 and 10 of said patent any product except wherein the superficially adherent layer of rubber-wax composition is formed from the composition comprising wax and rubber while hot and wherein the viscosity as set forth in said claims is a property of said composition comprising wax and rubber as initially compounded and as used in such forming process.

[*Official Gazette March 1, 1938.*]

DISCLAIMER 2,054,113.—*Allen Abrams* and *Charley L. Wagner*, Wausau, Wis. COATED SHEET MATERIAL. Patent dated September 15, 1936. Disclaimer filed February 7, 1938, by the assignee, *Marathon Paper Mills Company*.

Hereby disclaims from the scope of claim 5 of said patent any product except wherein the superficially adherent layer of rubber-wax composition is formed from the composition comprising wax and rubber while hot and wherein the viscosity as set forth in said claim is a property of said composition of wax and rubber as initially compounded and as used in such forming process;

And hereby disclaims from the scope of claims 6 and 10 of said patent any product except wherein the superficially adherent layer of rubber-wax composition is formed from the composition comprising wax and rubber while hot and wherein the viscosity as set forth in said claims is a property of said composition comprising wax and rubber as initially compounded and as used in such forming process.

[*Official Gazette March 1, 1938.*]